(12) United States Patent
Thorogood et al.

(10) Patent No.: US 9,713,824 B2
(45) Date of Patent: Jul. 25, 2017

(54) METHOD TO LINE PIPE HOMOGENEOUSLY

(71) Applicant: ENVIROLOGICS ENGINEERING Inc., Ontario (CA)

(72) Inventors: Brian Thorogood, Ontario (CA); Kevin Lillie, Ontario (CA); John Hochfeller, Ontario (CA)

(73) Assignee: ENVIROLOGICS ENGINEERING, INC., Ontario (CA)

( * ) Notice: Subject to any disclaimer, the term of this patent is extended or adjusted under 35 U.S.C. 154(b) by 0 days.

(21) Appl. No.: 14/777,314

(22) PCT Filed: Aug. 8, 2014

(86) PCT No.: PCT/CA2014/050753
§ 371 (c)(1),
(2) Date: Sep. 15, 2015

(87) PCT Pub. No.: WO2016/019451
PCT Pub. Date: Feb. 11, 2016

(65) Prior Publication Data
US 2016/0199879 A1   Jul. 14, 2016

(51) Int. Cl.
| B05D 1/40 | (2006.01) |
| B05D 3/00 | (2006.01) |
| B05D 7/22 | (2006.01) |
| B05C 7/00 | (2006.01) |
| F16L 58/02 | (2006.01) |
| B05C 7/06 | (2006.01) |
| B05D 3/12 | (2006.01) |
| B05C 7/08 | (2006.01) |
| B05C 7/04 | (2006.01) |
| F16L 55/164 | (2006.01) |
| F16L 55/40 | (2006.01) |

(Continued)

(52) U.S. Cl.
CPC ............... *B05D 7/222* (2013.01); *B05C 7/00* (2013.01); *B05C 7/04* (2013.01); *B05C 7/06* (2013.01); *B05C 7/08* (2013.01); *B05D 1/40* (2013.01); *B05D 3/12* (2013.01); *F16L 55/164* (2013.01); *F16L 55/40* (2013.01); *F16L 58/02* (2013.01); *F16L 58/1009* (2013.01); *B05D 2254/04* (2013.01); *B29C 63/26* (2013.01)

(58) Field of Classification Search
CPC . B05D 1/40; B05D 3/12; B05D 7/222; B05D 2254/04; B05C 7/00; B05C 7/04; B05C 7/06; B05C 7/08
USPC ................. 427/230, 239; 118/254, 407, 408, 118/DIG. 10
See application file for complete search history.

(56) References Cited

U.S. PATENT DOCUMENTS

| 7,160,574 B1 * | 1/2007 | Gillanders | ............... B05D 3/12 427/238 |
| 2005/0287294 A1 * | 12/2005 | Horn | ............... B05C 7/08 427/230 |
| 2012/0006420 A1 * | 1/2012 | Cooper | ............... B08B 9/0552 137/15.07 |

FOREIGN PATENT DOCUMENTS

| EP | 1 773 510 B1 | 2/2009 |
| WO | 2009099762 A1 | 8/2009 |
| WO | WO 2009/099762 A1 * | 8/2009 |

* cited by examiner

*Primary Examiner* — William Phillip Fletcher, III
(74) *Attorney, Agent, or Firm* — Andrew W. Chu; Craft Chu PLLC

(57) ABSTRACT

The method to radially displace liquid liner inside a pipe includes the step of flowing the liner around a distributive body placed within a pipe gas stream. As the gas streams past the distributive body, the liner coats the pipe homogeneously from top to bottom.

8 Claims, 3 Drawing Sheets

(51) Int. Cl.
*F16L 58/10* (2006.01)
*B29C 63/26* (2006.01)

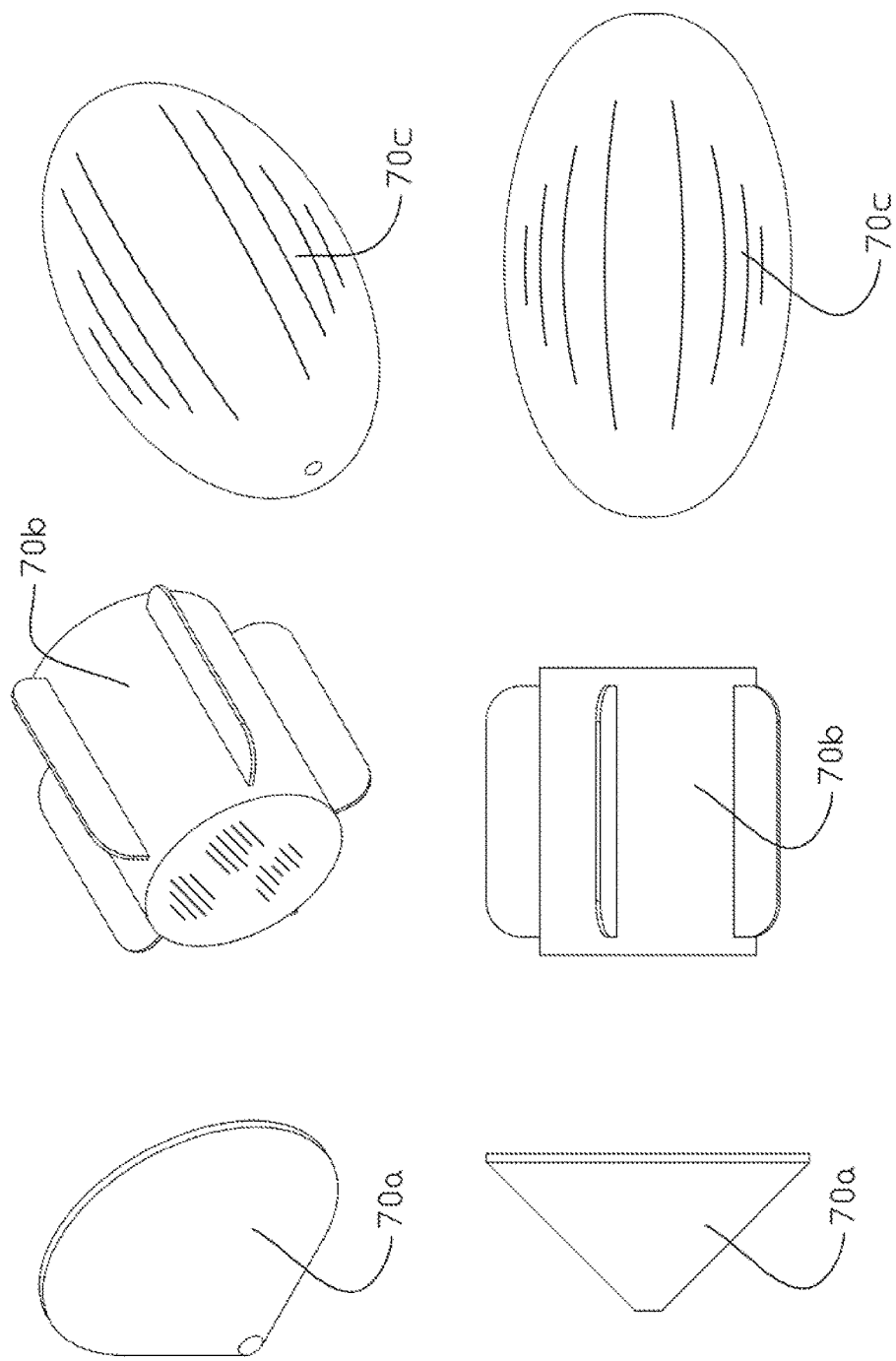

METHOD TO LINE PIPE HOMOGENEOUSLY

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to pipe lining, and more particularly a pipe lining method and apparatus to line a pipe homogeneously throughout.

2. Description of Related Art Including Information Disclosed Under 37 CFR 1.97 and 37 CFR 1.98

After gas and liquid transport pipes are cleaned and prepared (i.e. tubercules are removed, tar and bitumen and minimalized, leaks are detected and serviced, debris is removed), it is ideal to line them. Since bare metal corrodes over time, lining extends a pipe's life span.

Liners are typically liquid polymers of varying viscosity. The polymers eventually gel, solidify, or harden, over time. After that time, the pipes are reintroduced to service.

Conventional methods for applying polymer lining to pipes, like U.S. Pat. No. 5,873,390, U.S. Pat. No. 8,359,996, U.S. Pat. No. 5,590,689, U.S. Pat. No. 5,447,664, and U.S. Pat. No. 4,397,890 are known. These methods involve pushing a liquid polymer block or plug through pipes, essentially wiping the lining onto the pipe.

Problems with conventional methods also include not being navigable around bends, and unable to account for service connections.

These conventional methods also involve wall contact (at the plug's ends).

SUMMARY OF THE INVENTION

It is possible to blow liquid lining through a pipe (using compressed air), but lining tends to quickly pool at the pipe bottom. Lining shadows (meaning patches of decreased lining thickness) also form within the pipe, making for non-uniform pipe-lining. Shadows often form astern service connections, pipe elbows, and mal-aligned pipe joints.

The present is an improvement over conventional methods.

BRIEF DESCRIPTION OF THE DRAWINGS

FIG. 5 shows three differing non-orb distributive body embodiments in both perspective and plan views.

DETAILED DESCRIPTION OF THE DRAWINGS

In one embodiment the present forces liner to line the pipe inside wall by displacement and distribution.

In another embodiment it is a method to pass a distributive body through a pipe interior to displace and distribute liquid liner.

Figure 4:
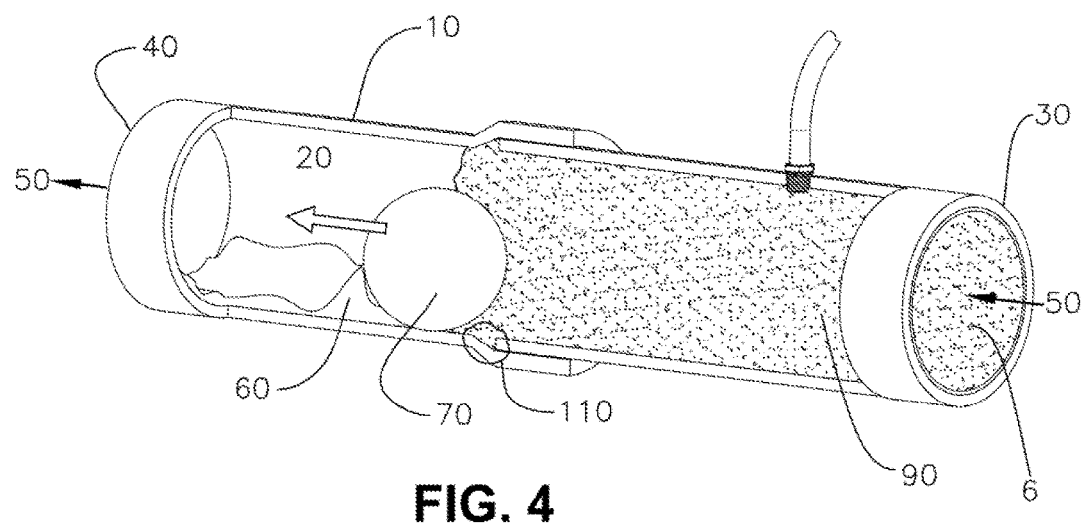
FIG. 4 is a cut-away perspective view of the pipe in FIG. 1 having a distributive body (shown as an orb) to displace and distribute liquid liner along the pipe wall.

The present invention is best wholly illustrated in FIG. 4.

FIG. 4 shows a pipe 10 in cut-away section, having an interior wall 20, a first 30 and second 40 end, and a unidirectional gas stream 50. The gas stream 50 streams from the first 30 toward the second 40 end.

Figure 1:
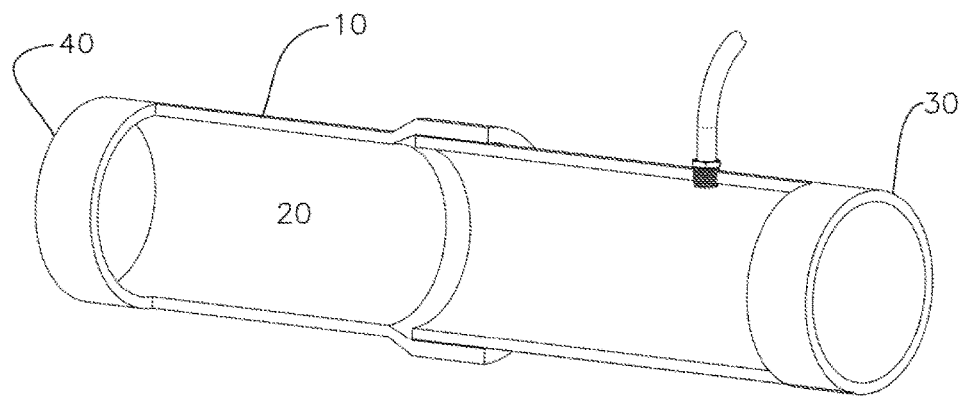
FIG. 1 is a cut-away perspective view of a pipe with service connection requiring lining.
Figure 2:
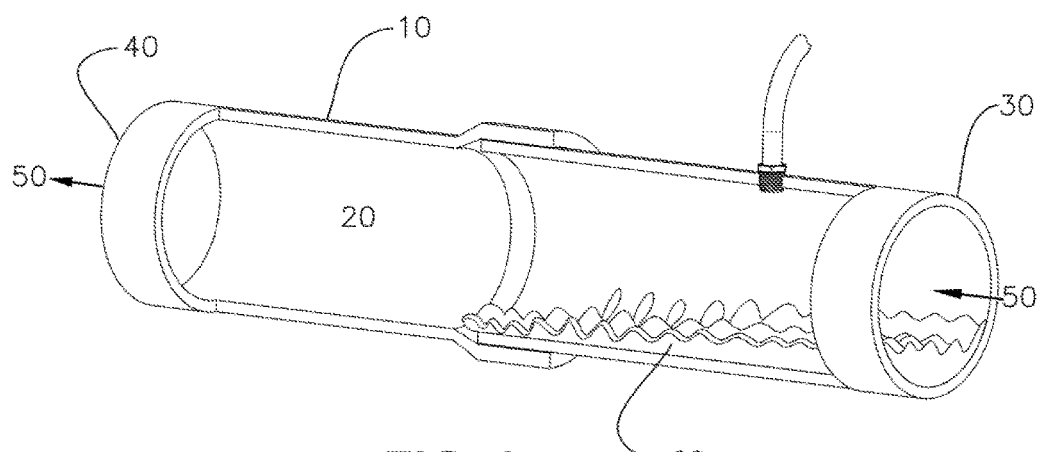
FIG. 2 is a cut-away perspective view the pipe in FIG. 1 subjected to a gas stream with pooling liquid liner.
Figure 3:
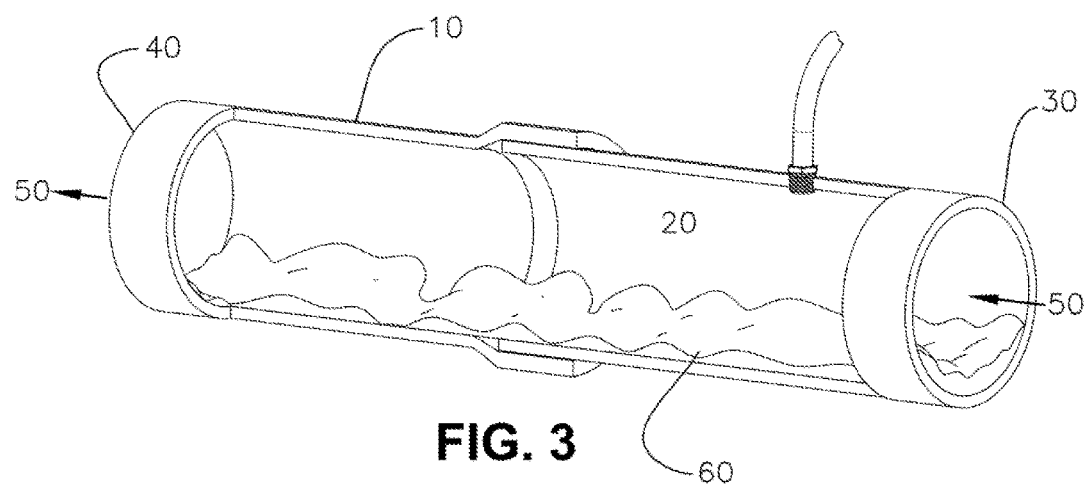
FIG. 3 is a cut-away perspective view of the pipe in FIG. 1 having a pooled liquid liner.

In one embodiment, after the gas stream 50 has been initiated, liquid liner 60 is introduced into the pipe 10. Depending on liner 60 viscosity, the liner 60 may pool along the pipe 10, as shown in FIG. 2. The liner 60 is generally propelled from the first 30 toward the second 40 pipe end, as shown in FIG. 3.

At this stage, the liner 60 is not yet uniformly applied throughout the pipe 10 interior from pipe 10 top to bottom.

A distributive body 70 is then introduced into the pipe 10. FIG. 4 shows the distributive body 70 as an orb. In an orb configuration, the orb must have a spherical diameter smaller than the pipe 10 longitudinal diameter.

By having a smaller diameter, the pipe gas stream 50 is able to stream past the distributive body 70, even though some of the gas stream 50 is temporarily partially obstructed.

Where the distributive body 70 differs in shape (from orb), such as the exemplary embodiments shown in FIG. 5 (70a, 70b, and 70c), the distributive body 70 is sized smaller than the pipe diameter, sufficient to partially obstruct the gas stream 50.

As the gas stream 50 encounters the distributive body 70, the gas stream 50 speeds up, and the gas pressure local to the distributive body lowers.

Once the gas stream 50 has cleared the distributive body 70, the gas stream 50 slows to its prior speed, and the gas pressure increases to its previous level.

The gas stream 50 obstruction results in radial outward displacement and distribution of the liner 60. As a result, the liner 60 in the gas stream 50 produces a complete and uniform 360 degree coat.

In a specific configuration, the gas stream 50 propels the distributive body 70 forward, from the first 30 toward the second 40 pipe end. In this configuration, the distributive body 70 is not tethered to either of the first 30 or second 40 pipe end.

In alternate configurations, the distributive body 70 may be tethered at either pipe 10 end, for feeding out or pulling the distributive body 70 accordingly.

As the distributive body 70 moves through the pipe 10 from one end 30 to the other 40, it comes upon and compresses pooled liner 60. On and near compression, and in the presence of the gas stream 50, the pooled liner 60 also rides up the pipe wall 20 to improve wall 20 coating homogeneity.

Distributive bodies 70 like those in FIG. 5 (conical, cylindrical, and elliptical prism respectively), when tethered to a pipe end 30, 40, might not rest on the pipe 10 bottom, and so might not compress the pooled liner 60. They might instead displace radially inward, when in a gas stream 50, causing radially outward liner 60 displacement (previously described).

The upward force from the gas stream 50 passing the distributive body 70 ensures liner 60 reaches the top of the pipe 10, to form a uniform coating/lining.

As the distributive body 70 passes from the first 30 toward the second 40 end, the liner adheres to the pipe wall 20 as generally shown by arrow 90.

As a result, the liner 60 does not have to be scraped or sponged along the pipe wall 20, as it does in the prior art. Also, instead of a pushing or pressure based system, as in the prior art, the present provides a stream based system. Liner 60 is aerodynamically flown and directed within the pipe 10, to ensure homogenous coating, even at service connections 100 and pipe joints 110.

If for any reason liner 60 has been introduced into the pipe 10 prior to streaming the unidirectional gas stream 50, the liner 60 can still be made to line the pipe wall 20 from top to bottom by placing into the pipe 10, the distributive body 70 and thereafter commencing gas streaming 50.

The distributive body 70 can be moved to any location required within the pipe 10, via the gas stream 50 propulsion (where the distributive body 70 is light enough, and untethered) or by a combination of feeding and pulling (where the distributive body 70 is tethered) and gas stream 50 propulsion.

Liner 60 curing/drying can be accelerated by supplying a heated gas stream 50.

We claim:

1. A method for lining interior of a pipe comprising:
   a) providing a pipe having an interior, a first end, and a second end distal from said first end;
   b) establishing a unidirectional pipe gas stream flowing throughout the pipe from the first end to the second end;
   c) introducing a liquid liner into the pipe gas stream through the first end of the pipe;
   d) introducing a distributive body into the pipe such that the distributive body moves through the pipe from the first end toward the second end in the pipe gas stream, said distributive body being shaped and sized to permit a partial gas stream clearance between said interior and said distributive body; and
   e) aerodynamically flowing said liquid liner within said pipe around said distributive body at said partial gas stream clearance so as to coat said interior of said pipe with a uniform thickness of said liquid liner from said interior top to bottom and end to end,
   wherein the step of aerodynamically flowing comprises the steps of:
   radially outwardly displacing and distributing the liquid liner at said partial gas stream clearance as the liquid liner and the pipe gas stream pass the distributive body,
   maintaining said partial gas stream clearance as constant around the distributive body, said distributive body being separate from said interior.

2. The method of claim 1, wherein the distributive body is tethered to at least one of said first end of the pipe and said second end of the pipe.

3. The method of claim 1, wherein the distributive body has a shape selected from the group consisting of: cone, cylinder, elliptical prism, and orb.

4. The method of claim 1, wherein the gas stream is heated.

5. A method for lining an interior of a pipe, the method comprising the steps of:
   a) moving a distributive body through a liquid liner from a first end of the pipe toward a second end of the pipe, said second end being distal from said first end;
   b) passing a unidirectional pipe gas stream throughout the pipe from the first end toward the second end, said distributive body being sized and shaped to permit partial gas stream clearance between the distributive body and the interior; and
   c) displacing and distributing said liquid liner at said partial gas stream clearance as the pipe gas stream passes the distributive body; and
   d) coating the interior with said liquid liner at uniform thickness top to bottom and end to end,
   wherein the step of coating comprises the step of:
   maintaining said partial gas stream clearance constant around said distributive body, said distributive body being separate from said interior.

6. The method of claim 5 wherein the distributive body is tethered to at least one of said first end of the pipe and said second end of the pipe.

7. The method of claim 5, wherein the distributive body has a shape selected from the group consisting of: cone, cylinder, elliptical prism, and orb.

8. The method of claim 5, wherein the gas stream is heated.

* * * * *